US011057757B2

(12) United States Patent
Lauster

(10) Patent No.: US 11,057,757 B2
(45) Date of Patent: Jul. 6, 2021

(54) TECHNIQUES FOR PROVIDING SUBSCRIBER-SPECIFIC ROUTING OF A ROAMING USER EQUIPMENT IN A VISITED COMMUNICATION NETWORK

(71) Applicant: Deutsche Telekom AG, Bonn (DE)

(72) Inventor: Reinhard Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/222,404

(22) Filed: Dec. 17, 2018

(65) Prior Publication Data
US 2019/0200207 A1   Jun. 27, 2019

(30) Foreign Application Priority Data
Dec. 22, 2017  (EP) .................................. 17210091

(51) Int. Cl.
*H04W 24/00*  (2009.01)
*H04W 8/06*   (2009.01)
(Continued)

(52) U.S. Cl.
CPC ............... *H04W 8/06* (2013.01); *H04W 8/02* (2013.01); *H04W 8/12* (2013.01); *H04W 92/24* (2013.01)

(58) Field of Classification Search
CPC ........... H04W 8/02; H04W 8/06; H04W 8/12; H04W 92/24
See application file for complete search history.

(56) References Cited

U.S. PATENT DOCUMENTS

2011/0269457 A1* 11/2011 Liu ..................... H04W 8/06
                                                      455/433
2013/0259229 A1* 10/2013 Thumparthy ......... H04W 12/02
                                                      380/247
(Continued)

FOREIGN PATENT DOCUMENTS

WO    2013124334 A1    8/2013
WO    2016192639 A1   12/2016
WO    2017051172 A1    3/2017

OTHER PUBLICATIONS

"3rd Generation Partnership Project; Technical Specification Group Services and System Aspects; System Architecture for the 5G System; Stage 2 (Release 15)," 3GPP, Version 1.5.0, Nov. 2017, 170 Pages.
(Continued)

*Primary Examiner* — Khalid W Shaheed
(74) *Attorney, Agent, or Firm* — Workman Nydegger

(57) ABSTRACT

A method for initiating a roaming communication link with a user equipment in a visited communication network comprises: transmitting a registration request by the UE to a network entity of the visited communication network; detecting by the network entity of the visited communication network that the registration request is related to a roaming communication with the UE; determining by the network entity of the visited communication network a home communication network of the UE; retrieving, by the network entity of the visited communication network, subscriber-specific data of the UE from a routing data layer entity of the visited communication network for roaming the UE in the visited communication network, wherein the RDL entity is coupled to the home communication network of the UE via a data base interface; and initiating the roaming communication link with the UE based on the subscriber-specific data of the UE received via the RDL entity.

18 Claims, 4 Drawing Sheets

(51) Int. Cl.
*H04W 8/02* (2009.01)
*H04W 8/12* (2009.01)
*H04W 92/24* (2009.01)

(56) References Cited

U.S. PATENT DOCUMENTS

| | | | |
|---|---|---|---|
| 2014/0355520 A1* | 12/2014 | Wallis | H04W 12/06 |
| | | | 370/328 |
| 2018/0270666 A1* | 9/2018 | Lee | H04W 12/0804 |
| 2018/0332441 A1* | 11/2018 | Shaw | H04L 41/12 |
| 2018/0367997 A1* | 12/2018 | Shaw | H04W 12/0806 |
| 2018/0376338 A1* | 12/2018 | Ashrafi | H04L 41/0806 |

OTHER PUBLICATIONS

"3rd Generation Partnership Project; Technical Specification Group Services and System Aspects; Procedures for the 5G System; Stage 2 (Release 15)," 3GPP, Version 2.0.0, Dec. 2017, 260 Pages.
Extended European Search Report from EP Application No. 17210091.9, dated Mar. 13, 2018.

\* cited by examiner

TECHNIQUES FOR PROVIDING SUBSCRIBER-SPECIFIC ROUTING OF A ROAMING USER EQUIPMENT IN A VISITED COMMUNICATION NETWORK

TECHNICAL FIELD

The invention relates to techniques for providing subscriber-specific routing of a roaming user equipment (UE) in a visited communication network, in particular in a network slice of the visited communication network. In particular, the invention relates to a method for initiating a roaming communication link with a UE in a visited communication network by using a routing data layer (RDL) entity. The invention further relates to an RDL entity providing the subscriber-specific data in synchronization with corresponding subscriber-specific data stored in the home communication network.

BACKGROUND

Operators worldwide are currently preparing for the transition to 5G networks. To support the wide range of services planned for 5G, a new core network known as Next-Generation Core or NG Core is planned. Its structure is described, for example, in the technical specification TS 23.501 (V1.5.0) of 3GPP. It specifies requirements for designing and operating a 5G service-oriented core network.

The service-oriented 5G core network is based on the premise that 5G shall support very different services with very different performance requirements. Three different service categories for 5G are identified: 1) Enhanced Mobile Broadband (eMBB), 2) Massive machine-type communication (mMTC, also known as IoT, Internet of Things) and 3) Ultra-Low Latency (UR-LLC) communication.

This includes use cases or application scenarios such as industrial control, augmented reality (AR) or augmented reality/virtual reality (VR) and networked cars. The goal is to use end-to-end network slices to map and support these diverse services and technologies on a physical network infrastructure. In this way, operators can operate new services in foreign network sectors and insert their networks into new industrial value chains.

When starting operation of the communication terminal, i.e. the mobile terminal, the machine terminal such as of the self-driven car or drone, also denoted herein as user equipment (UE), currently a complex procedure is necessary when the UE is located in the visited network or in an external communication network. This procedure is necessary in order to fetch the subscriber-specific data of the UE from the home communication network, also denoted as home PLMN (Public Land Mobile Network) and to inform the UE. These subscriber-specific data of the UE can for example include registration and/or authentication data of the UE in the visited PLMN, such as identification and telephone number, e.g. IMSI (International Mobile Subscriber Identity) or IMEI (International Mobile Equipment Identity) or SIM ID (Subscriber Identity Module Identity). Further, for logging into the visited network, also referred to as visited PLMN, allowed capabilities and/or policies of the visited PLMN, e.g. network technology, support for certain services, etc. are required.

SUMMARY OF THE INVENTION

It is the object of the present invention to provide a concept to solve the above-mentioned problems, in particular to speed up the connection procedure of the UE in the visited PLMN, and thus to increase the performance and flexibility of communication, especially when roaming in the above described 5G communication networks.

A further object of the present invention is to introduce a new system architecture for simplifying the 5G roaming architecture.

The foregoing and other objects are achieved by the subject matter of the independent claims. Further implementation forms are apparent from the dependent claims, the description and the figures.

The methods and systems presented below may be of various types. The individual elements described may be realized by hardware or software components, for example electronic components that can be manufactured by various technologies and include, for example, semiconductor chips, ASICs, microprocessors, digital signal processors, integrated electrical circuits, electro-optical circuits and/or passive components.

The devices, systems and methods presented below are capable of transmitting information over a communication network. The term communication network or communication network refers to the technical infrastructure on which the transmission of signals takes place. The communication network essentially comprises the switching network in which the transmission and switching of the signals takes place between the stationary devices and platforms of the mobile radio network or fixed network, and the access network in which the transmission of the signals takes place between a network access device and the communication terminal. The communication network can comprise both components of a mobile radio network as well as components of a fixed network. In the mobile network, the access network is also referred to as an air interface and includes, for example, a base station (NodeB, eNodeB, radio cell) with mobile antenna to establish the communication to a communication terminal as described above, for example, a mobile phone or a mobile device with mobile adapter or a machine terminal. In the fixed network, the access network includes, for example, a DSLAM (digital subscriber line access multiplexer) to connect the communication terminals of multiple participants based on wires. Via the switching network the communication can be transferred to other networks, for example other network operators, e.g. foreign networks.

The communication networks presented below may include various technologies and network standards, for example according to the 5G system architecture. This includes the concept of network slicing. Network slicing is a form of virtual network architecture that uses the same principles as software-defined networking (SDN) and network functions virtualization (NFV) in fixed networks. SDN and NFV are used to provide greater network flexibility by partitioning traditional network architectures into virtual elements that can be linked together, even through software.

Network slicing allows multiple virtual networks to be created on a common physical infrastructure. The virtual networks are then adapted to the specific needs of applications, services, devices, customers or operators.

Each virtual network (network slice) comprises an independent set of logical network functions that support the needs of the particular use case, where the term "logical" refers to software.

Each of these virtual networks or network slices is optimized to provide the resources and network topology for the particular service and traffic using the corresponding segment. Features such as speed, capacity, connectivity, and coverage are assigned to meet the specific needs of each use case, but functional components can also be shared across different network slices.

Each network slice can be completely isolated, so that no network slice can disturb the traffic in another network slice. This reduces the risk of introducing and operating new services and also supports migration as new technologies or architectures can be started on isolated slices. It also affects security, because if a cyber-attack breaks a slice, the attack is contained and cannot spread beyond that slice.

Each network slice is configured with its own network architecture, engineering mechanism, and network deployment. To do this, each network slice can receive management capabilities that can be controlled by the network operator or the customer depending on the application. The network slices can be independently managed and orchestrated.

According to a first aspect the invention relates to a method for initiating a roaming communication link with a user equipment (UE) in a visited communication network, in particular in a network slice of the visited communication network, the method comprising: transmitting a registration request by the UE to a network entity of the visited communication network, wherein the registration request comprises an identity (UE ID) of the user equipment; detecting by the network entity of the visited communication network, based on the UE ID, that the registration request is related to a roaming communication with the UE; determining by the network entity of the visited communication network a home communication network of the UE; retrieving, by the network entity of the visited communication network, subscriber-specific data of the UE from a routing data layer (RDL) entity of the visited communication network for roaming the UE in the visited communication network, wherein the RDL entity is coupled to the home communication network of the UE via a data base interface; and initiating the roaming communication link with the UE based on the subscriber-specific data of the UE received via the RDL entity.

When installing a routing data layer (RDL) entity in the visited communication network, the UE's connection procedure in the visited PLMN can be accelerated since the UE can obtain all relevant data to establish the roaming communication over the visited network from the RDL entity which provides all required data for the roaming UE. Hence, the UE no longer needs to query a variety of network elements using a variety of different interfaces, which may not even exist in the visited network, and possibly make the construction of the roaming connection fail. This increases the performance and flexibility of the communication, especially when roaming in 5G communication networks. In particular for 5G communication networks, the system architecture for the roaming scenario can be simplified since the new RDL entity can hold all required data, thereby replacing all other communications required for obtaining the roaming data.

In an exemplary implementation form, the method comprises: requesting, by the RDL entity, the subscriber-specific data of the UE from a unified data repository (UDR) of the home communication network of the UE.

This has the advantage that the network entity can query all necessary data from the RDL entity in the visited communication network and thus simplifies the roaming procedure for the UE. The network entity can thus provide the UE with an image of the data required for roaming. By using data query from the RDL entity, the number of messages required for the roaming procedure can be reduced which avoids congestion and overload in the visited (and also home) communication network.

In an exemplary implementation form of the method, the data base interface provides a secure interface between the RDL entity and the UDR of the home communication network over which data of the RDL entity is synchronized with corresponding data of the UDR.

This provides the advantage that secure keys can be transported via that data base interface. Then, the UE (or the respective network element in the visited communication network, e.g. the AMF entity) can perform all authentication and authorization tasks directly with the RDL entity in the visited communication network and is not required to contact the Authentication Server of its home communication network. When data of the RDL entity is synchronized with corresponding data of the UDR, performing authentication and authorization with the RDL entity is equivalent to performing authentication and authorization with the UDR of the home communication network.

In an exemplary implementation form, the method comprises: synchronizing the subscriber-specific data stored in the RDL entity by a network entity of the home communication network, in particular an AMF entity or an SMF entity.

This provides the advantage of higher design flexibility. The synchronization of the subscriber-specific data of the RDL entity can be performed by the network entities of the home communication network or by the network entities as e.g. the AMF or the SMF of the visited communication network.

In an exemplary implementation form, the method comprises: requesting, by the RDL entity, the subscriber-specific data of the UE via a routing shared data layer (RSDL) interface with the home communication network.

This provides the advantage that the routing shared data layer (RSDL) provides a dedicated roaming interface between the RDL entity of the visited communication network and the home communication network, e.g. the UDR database. This roaming interface can be a direct interface between the respective network entities. This roaming interface can be preconfigured or established upon request. In any case, the roaming process is simplified by using that new dedicated roaming interface.

In an exemplary implementation form, the method comprises: storing or providing, by the RDL entity, a local replica of the subscriber-specific data of the UE, wherein the local replica is obtained from a unified data repository (UDR) of the home communication network.

This provides the advantage that the same subscriber-specific data of the home communication network are replicated to the visited communication network, the RDL entity hence provides a copy of the required data for the roaming process in the local environment of the visited communication network. This kind of data repository accelerates the roaming process and reduces data and message traffic on the various communication interfaces in and in between each of the visited communication network and the home communication network.

In an exemplary implementation form, the method comprises: updating the local replica of the user specific data of the RDL entity with the subscriber-specific data from the UDR of the home communication network.

This provides the advantage that the actual subscriber-specific data required for the roaming UE is available in the visited communication network. Any changes of these data are tracked from the home communication network to the visited communication network. Thus, efficient roaming data processing can be achieved.

In an exemplary implementation form, the method comprises: retrieving, by the network entity of the visited communication network, the subscriber-specific data of the UE based on data base functions applied to the RDL entity.

This provides the advantage of easy processing the roaming-related messages and easy updating the subscriber-specific data in the RDL entity since the data base functions only require a memory address for retrieving the respective data. Such a memory address can be for example the UE ID and/or PLMN ID of the home communication network or of another PLMN.

In an exemplary implementation form, the method comprises: retrieving, by an AMF entity of the visited communication network, the subscriber-specific data of the UE based on a database function call directed to the RDL entity.

This provides the advantage of easy processing the roaming-related messages. The UE (or the AMF entity) can just call a function such as a data base function, e.g. "get_subscriber-specific data (UE_ID)", to receive the required data. There is no need to determine which communication interfaces are required to obtain the subscriber-specific data.

In an exemplary implementation form, the method comprises: encrypting and/or encoding the subscriber-specific data of the UE stored or provided by the RDL entity.

This provides the advantage that the subscriber-specific data can be securely stored in the RDL entity and the UE (or the network entity of the visited communication network configured to perform the roaming tasks) can access the RDL entity for authentication and/or authorization tasks.

In an exemplary implementation form, the method comprises: storing a secure key for decrypting and/or decoding the subscriber-specific data stored or provided by the RDL entity in the home communication network, in particular in a UDR of the home communication network.

This provides the advantage that the home communication network, in particular the AUSF entity of the home communication network is the master of the authentication/authorization and can synchronize the subscriber-specific data in the RDL entity each time it has changed in the home communication network.

In an exemplary implementation form, the method comprises: retrieving, by the network entity of the visited communication network, the secure key from the home communication network before retrieving the subscriber-specific data from the RDL entity.

This provides the advantage that the contents of the RDL entity cannot be corrupted by accesses from non-authorized network entities.

In an exemplary implementation form, the method comprises: requesting, by the RDL entity, the subscriber-specific data of the UE via an interface with an AMF entity of the home communication network or via an interface with an SMF entity of the home communication network.

This provides the advantage that the AMF entity of the home communication network can manage the access and mobility management and also the network slice selection related to the roaming communication. The SMF entity can manage the session management functions, can set up sessions and manage them according to the network policy of the roaming communication.

According to a second aspect, the invention relates to a routing data layer (RDL) entity for providing subscriber-specific data of a roaming user equipment (UE) in a visited communication network, the RDL entity comprising: a communication interface (R1) with a network entity of the visited communication network; a data base interface with a home communication network of the UE; and a data repository configured to store subscriber-specific data of the roaming UE, wherein the data repository is configured to provide the subscriber-specific data to the network entity of the visited communication network, and wherein the data repository is configured to keep the subscriber-specific data synchronized with corresponding subscriber-specific data stored in the home communication network.

The routing data layer (RDL) entity in the visited communication network can accelerate the roaming process since the UE can obtain all relevant data to establish the roaming communication in the visited network from the RDL entity which provides all required data for the roaming UE. Hence, the UE no longer needs to query a variety of network elements using a variety of different interfaces, which may not even exist in the visited network, and possibly make the construction of the roaming connection fail. This increases the performance and flexibility of the communication, especially when roaming in 5G communication networks. In particular for 5G communication networks, the system architecture for the roaming scenario can be simplified since the new RDL entity can hold all required data, thereby replacing all other communications required for obtaining the roaming data.

In an exemplary implementation form of the RDL entity, the communication interface (R1) with the network entity of the visited communication network is configured to control the RDL entity by the network entity of the visited communication network, in particular by an AMF entity of the visited communication network to request the subscriber-specific data from the home communication network.

This provides the advantage that the network entity, in particular the AMF entity of the visited communication network has a direct interface, the R1 communication interface to the RDL entity. This direct interface reduces the number of messages in the visited communication network and guarantees roaming with low latency and high efficiency.

According to a third aspect, the invention relates to a communication system, in particular a 5G communication system, comprising: a visited communication network of a UE, in particular a network slice of the visited communication network; a home communication network of the UE; and a routing data layer (RDL) entity of the visited communication network according to the second aspect, configured to provide subscriber-specific data of the UE, wherein the subscriber-specific data of the UE is synchronized with corresponding subscriber-specific data of the UE stored in the home communication network.

A communication system with such a routing data layer (RDL) entity in the visited communication network can accelerate the roaming process since the UE can obtain all relevant data to establish the roaming communication in the visited network from the RDL entity which provides all required data for the roaming UE. Hence, the UE no longer needs to query a variety of network elements using a variety of different interfaces, which may not even exist in the visited network, and possibly make the construction of the roaming connection fail. This increases the performance and flexibility of the communication, especially when roaming in 5G communication networks. In particular for 5G communication networks, the system architecture for the roaming scenario can be simplified since the new RDL entity can hold all required data, thereby replacing all other communications required for obtaining the roaming data.

According to a fourth aspect the invention relates to a computer program product comprising program code for performing the method according to the first aspect of the invention, when executed on a computer or a processor.

Embodiments of the invention can be implemented in hardware and/or software.

BRIEF DESCRIPTION OF THE DRAWINGS

Further embodiments of the invention will be described with respect to the following figures, wherein.

DETAILED DESCRIPTION OF EMBODIMENTS

Figure 1:
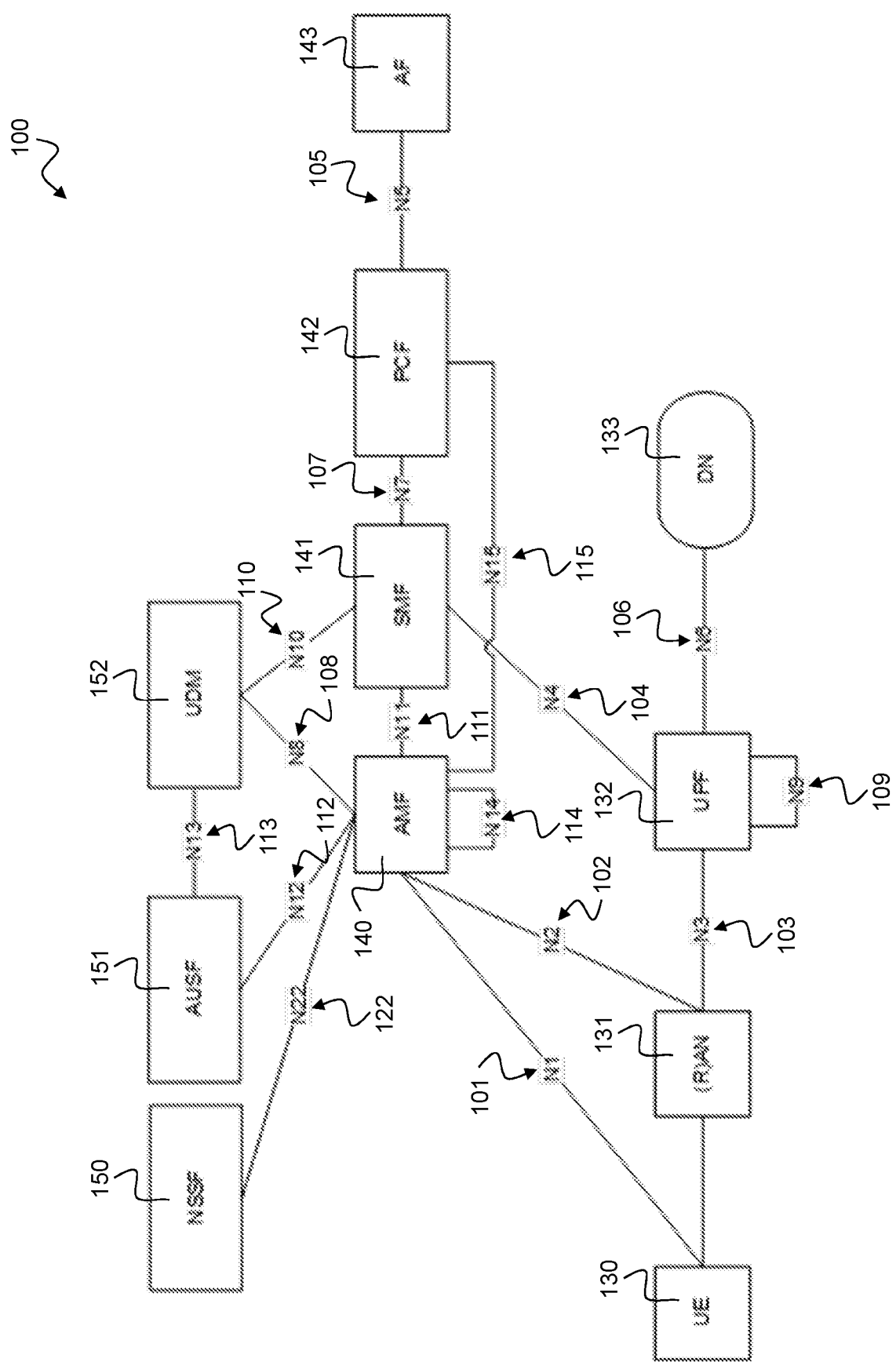
FIG. 1 shows a schematic diagram illustrating a system architecture of a 5G communication network 100.

In the following detailed description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The following describes network entities such as network access entities and functions of such a network access entity or radio access network (RAN) entities. The network access entity enables access and mobility management in the communication network. Via the network access entity, communication terminals with their identity (UE ID) can register in the communication network and receive the permission to set up a communication connection. For example, in the 5G communication network, the network access entity may be an AMF (Access and Mobility Management Function) representing the access and mobility management function. This manages the access and mobility control. The AMF may also include network slice selection functionality. For wireless access, mobility management is not needed. The network access entity may be, for example, an MME (mobility management entity) in the 4G communication network. The MME is a network component of the LTE (Long Term Evolution) mobile radio standard, which performs the functions of paging to set up calls and generally communication links as well as signaling for control purposes. The MME forms the link between core network and access network. The MME manages the locations of all mobile communication terminals in the radio cells connected to it. In the LTE system, several cells are usually combined to form a tracking area. The management area of an MME can be divided into several tracking areas.

The radio access network (RAN) is part of a mobile telecommunication system. It implements a radio access technology (RAT). Conceptually, it resides between a device such as a mobile phone, a computer, or any remotely controlled machine and provides connection with its core network (CN). Depending on the standard, mobile phones and other wireless connected devices are varyingly known as user equipment (UE), terminal equipment, mobile station (MS), etc. RAN functionality is typically provided by a RAN entity, e.g. a silicon chip, residing in both the core network as well as the user equipment. Examples of radio access network types are GERAN, the GSM radio access network including EDGE packet radio services, UTRAN, the UMTS radio access network, E-UTRAN, the LTE radio access network and the 5G RAN. The RAN entity can for example include a base station, e.g. a NodeB or and eNodeB or a 5G capable radio cell.

The network access entity further provides the technical function of first establishing a security relationship with a previously unknown security device, in order to then be able to install security elements (keys) in the device itself and in the network application function (NAF) of the network access function. For example, the Diameter and Hypertext Transfer Protocol (http) protocols can be used. For example, SOAP may be used between BSF and NAF instead of diameter.

Involved in the maintenance of such a generic security relationship are the following functional elements: terminal, e.g. a mobile phone, i.e. User Equipment (UE), which wants to use a particular service, application server that provides the service, e.g. for Mobile TV, VoLTE, VoIP, FTP data transfer, media streaming, Internet browsing, etc., Network Application Function (NAF), the network access entity itself, which establishes a security relationship between UE and NAF and a database of the home network, e.g. HSS Home Subscriber Server (HSS) or UDR, unified data repository of the (mobile) network provider, which manages the respective user-specific profiles of its terminal users.

The network access entity network access feature is consulted by the application server (NAF) after a terminal has requested service access from it. Since the application server does not yet know the terminal at this time, it first refers this to the network access function. The terminal and the network access function now authenticate to each other; this can be done, for example, by means of the AKA protocol (Authentication and Key Agreement) and by inquiring the network access function to the Home Subscriber Server (HSS) or the UDR database of the home network. Subsequently, the network access function and the terminal (UE) agree on a session key to be used for encrypted data exchange with the application server (NAF). If the terminal now again turns to the application server, it can obtain both the session key and subscriber-specific data from the network access function and start the data exchange with the terminal (UE). The appropriate session keys are used for cryptographic protection.

The security relationship itself between terminal and network access entity never leaves the sovereignty of the (mobile) network operator, only data derived from this security relationship (key) can be queried and used by applications.

In particular, the network entities described in this disclosure are intended to facilitate the establishment of the roaming connection of the communication terminal, as described below in this disclosure.

In the following, a routing data layer (RDL) entity is described. Such an RDL entity is a network entity, in particular a network entity of a visited communication network that provides a data repository for specific data stored in the home communication network. Hence, the roaming subscriber or the corresponding network entities of the visited communication network can access the RDL entity instead of the corresponding databases of the home communication network for retrieving data such as subscriber-specific data which is required for the roaming UE. The RDL entity can be synchronized from remote, e.g. from the home communication network, for example via shared data layer functions.

A routing shared data layer (RSDL), also denoted as roaming shared data layer, as described herein is a data layer, i.e. a data interface that is shared by two networks or network entities. The routing shared data layer can be a database interface via which data can be transported from one network entity to another network entity, e.g. from an AMF or SMF entity of the home communication network to an RDL entity (or also to an AMF or SMF) of the visited communication network. The routing shared data layer may be controlled by user plane functions (UPFs) of the home communication network and/or the visited communication network. The routing shared data layer may use (or share) the data network (DN) between visited communication network and home communication network. A specific function of the RSDL is for example to synchronize the RDL entity from remote, e.g. from the home communication network. The routing shared data layer may provide a data layer sharing particularly for the roaming scenario. For example, the routing shared data layer may provide a shared data layer to the following data base components: Unified Data Repository (UDR), Unified Data Management (UDM), Network Slice Selection Function (NSSF), Authentication Server Function (AUSF), Policy Control Function (PCF), e.g. according to the specification 3GPP TS 23.501.

FIG. 1 shows a schematic diagram illustrating a system architecture of a 5G communication network 100. The 5G system architecture 100 comprises the network functions illustrated in the individual blocks of FIG. 1.

The UE (User Equipment) block 130 represents the user equipment or client terminal or mobile communication device which can be operated by the subscriber to initiate communication in the 5G network, i.e. starting a communication (mobile originating, MO) or accepting (mobile terminating, MT). The UE can also initiate communication without user interaction, e.g. it can be a machine terminal, e.g. for a car or a robot or other device.

The block (R)AN ((radio) access network) 131 represents the (radio) access network by which the UE 130 obtains access to the 5G communication network. The interface between UE 130 and (R)AN is either an air interface when the access network 131 is a wireless network or wired when the access network is a wired network.

The Access and Mobility Management Function (AMF) block 140 represents the access and mobility management function. It manages the access and mobility functions of the UE. The AMF may also include network slice selection functionality. For wireless access, mobility management is not needed.

The Session Management Function (SMF) block 141 represents the session management function. It sets up sessions and manages them according to the network policy.

The User Plane Function (UPF) block 132 represents the User Plane function. UPFs can be applied in various configurations and locations, according to the service type.

The Policy Control Function (PCF) block 142 represents the policy control function. It provides a policy framework that includes network slicing, roaming, and mobility management. This corresponds to the functionality of a PCRF in 4G systems.

The block UDM (Unified Data Management) 152 provides a shared data management. This saves subscriber data and profiles. This is equivalent to the functionality of an HSS in 4G systems, but is used for both mobile and wired access in the NG Core network.

The block DN (Data Network) 133 provides the data network over which data is transmitted, e.g. from one UE to another UE.

The block AUSF (Authentication Server Function) 151 provides authentication functionality with which the subscriber or the UE can log on to the network.

The AF (Application Function) block 151 provides application functions that enable certain services to be executed.

The NSSF block (Network Slice Selection Function) 150 provides functions to select particular network slices.

The 5G system architecture shown in FIG. 1 represents the structure of the NG (Next Generation) network, which consists of network functions (NFs) and reference points connecting the NFs. The UE 130 is connected to either a Radio Access Network (RAN) 131 or an Access Network (AN) 131. In addition, the UE 130 is connected to the Access and Mobility Function (AMF) 140. The RAN 131 represents a base station using new RAT and advanced LTE technologies, while the AN 131 is a general base station with non-3GPP access, e.g. a WiFi Access Point. The Next Generation core network 100 consists of various network functions (NFs). In FIG. 1, there are seven Next Generation core NFs, namely (1) AMF 140, (2) Session Management Function (SMF) 141, (3) Policy Control Function (PCF) 142, (4) Application Function (AF) 143, (5) Authentication Server Function (AUSF) 151, (6) User Plane Function (UPF) 132, and (7) User Data Management (UDM) 152.

The network function (NF) represents the processing function inherited from 3GPP in NextGen or NG. It has both functional behavior and serves as an interface. An NF can either be implemented as a network element (or network entity) on dedicated hardware, as a software instance on dedicated hardware, or instantiated as a virtualized function on a suitable platform, e.g. B. a cloud infrastructure.

The AMF 140 provides UE-based authentication, authorization, mobility management, etc. A UE 130 is basically connected to a single AMF 140 because the AMF 140 is independent of the access technology. That means, also a UE 130 with multiple access technologies is only connected to a single AMF 140.

The SMF 141 is responsible for session management and assigns IP addresses to the UEs 130. In addition, the SMF 141 selects the UPF 132 and controls the UPF 132 for data transfer. If a UE 130 has multiple sessions, different SMFs 141 may be associated with each session to individually control them and possibly provide multiple functionalities per session.

The AF 143 provides information about the packet flow and provides it to the PCF 142, which is responsible for policy control to ensure Quality of Service (QoS). Based on this information, PCF 142 will determine the Mobility and Session Management policies for the AMF 140 and SMF 141 to function properly.

The AUSF 151 stores data for authentication of the UE 130 while the UDM 152 stores subscription data of the UE 130. The data network DN 133, which is not part of the NG core network 100, provides Internet access and operator services.

The architectural reference point view can be used to represent detailed message flows in Next Generation (NG) standardization. The reference point Next Generation NG1 101 is defined as transmission signaling between the UE 130 and the AMF 140. The reference points for the connection between the AN 131 and the AMF 140 and between the AN 131 and the UPF 132 are referred to as NG 2 102 and NG3 103. There is no reference point between the AN 131 and the SMF 141, but there is a reference point, NG11 111, between the AMF 140 and the SMF 141. This means that the SMF 141 is controlled by the AMF 140. NG4 104 is used by the SMF 141 and the UPF 132 to allow the UPF 132 to be set with the generated control signal from the SMF 141, and the UPF 132 can report its status to the SMF 141. NG9 109 is the reference point for the connection between different UPFs 132 and NG14 114 is the reference point between different AMFs 140. NG15 115 and NG7 107 are defined in order for PCF 142 to apply its policies to AMF 140 and SMF 141, respectively. NG12 112 is required for the AMF 140 to perform authentication of the UE 130. NG8 108 and NG10 110 are defined because the subscription data of UE 130 is needed by AMF 140 and SMF 141.

The Next Generation Network 100 aims to realize a separation of user and control or control level. The user level transmits the user traffic, while the control level transmits the signaling on the network. In FIG. 1, the UPF 132 is in the user plane and all other network functions, i.e. AMF 140, SMF 141, PCF 142, AF 143, AUS 151 and UDM 152 are in the control plane. Separation of user and control planes guarantees independent scaling of resources at each network level. The separation also allows the provision of UPFs 132 in a distributed manner separate from the functions of the control plane.

The NG Architecture 100 consists of modularized functions. For example, AMF 140 and SMF 141 are independent functions in the control plane. Separate AMF 140 and SMF 141 allow independent development and scaling. Other control plane functions such as PCF 142 and AUSF 151 may be separated as shown in FIG. 1. The modularized functional design illustrated in FIG. 1 also enables the Next Generation Network 100 to flexibly support various services.

Each network function interacts directly with another NF. At the control level, a series of interactions between two NFs are defined as a service, so that they can be reused. This service allows support for modularity. The user level supports interactions such as forwarding operations between different UPFs 132.

The Next Generation Network 100 supports roaming similar to EPS (Enhanced Packet Switching). There are two types of application scenarios, Home Routed (HR) and Local Breakout (LBO). The structures that support roaming and the corresponding session management according to the concept presented here will be described in more detail below.

Figure 2:
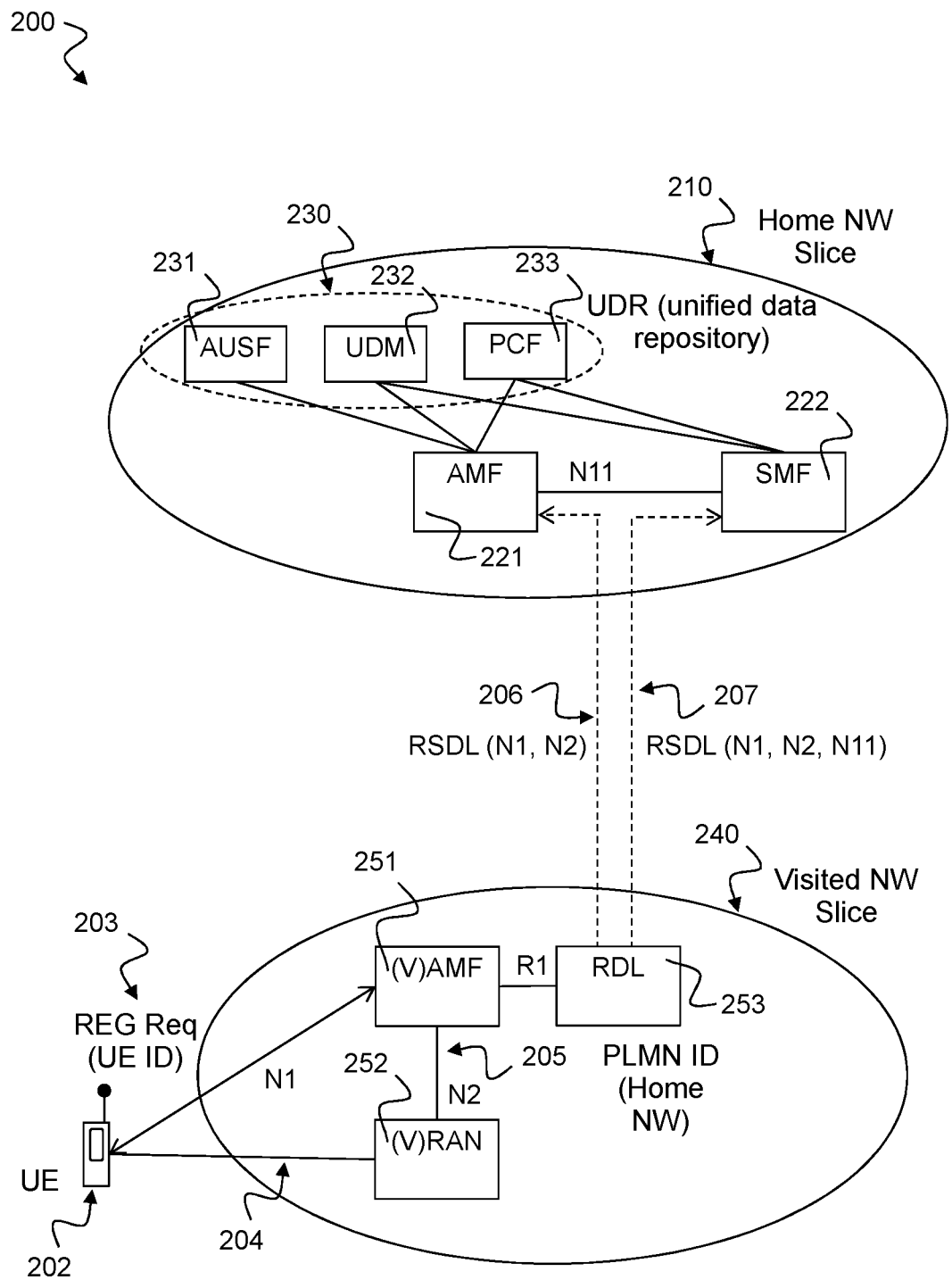
FIG. 2 shows a schematic diagram illustrating an exemplary roaming scenario for a 5G communication network 200 with visited communication network slice 240 and home communication network slice 210.

FIG. 2 shows a schematic diagram illustrating an exemplary roaming scenario for a 5G communication network 200 with visited communication network slice 240 and home communication network slice 210.

The 5G communication network 200 is divided into a home PLMN (Public Land Mobile Network) 210 and a visited PLMN 240. Both networks 210, 240 have the same structure as generally described above in FIG. 1, for the sake of clarity not all network elements are shown in detail. In particular, the visited network 240 includes an AMF network element 251, also referred to herein as (V) AMF, having the same functionality and interfaces as the AMF 140 described above with respect to FIG. 1. The visited network 240 further includes a radio access network (RAN) element 252, also referred to herein as (V) RAN, having the same functionality, and interfaces as the RAN 131 described above with reference to FIG. 1.

The same network elements (with the same functionalities and interfaces) also include the home MAIN 210, i.e. an AMF network element 221, an SMF network element 222 and a database UDR 230 with the network elements AUSF 231, UDM 232 and PCF 233. The home PLMN is the PLMN in which the communication terminal or the user of the communication terminal is registered, i.e. where he has a contract with the network operator. The visited PLMN is the PLMN in whose network coverage the communication terminal or its user is currently residing and via which the user has communicated, i.e. wants to establish a roaming connection.

Specifically, the method for initiating the roaming communication link with the user equipment (UE) 202 in the visited communication network 240, in particular in a network slice of the visited communication network 240, includes the following steps:

In a first step, the UE 202 transmits a registration request 203 to a network entity 251 of the visited communication network 240. The registration request may include an identity UE ID of the user equipment, e.g. a SIM ID, an IMSI or an IMEI or a MAC address or an IP address.

In a second step, the network entity 251 of the visited communication network 240 detects, based on the UE ID, that the registration request 203 is related to a roaming communication with the UE 202.

In a third step, the network entity 251 of the visited communication network 240 determines a home communication network 210 of the UE 202 or alternatively another PLMN to which roaming is configured.

In a fourth step, the network entity 251 of the visited communication network retrieves subscriber-specific data of the UE 202 from the routing data layer RDL entity 253 of the visited communication network 240 for roaming the UE in the visited communication network 240. The RDL entity 253 is coupled to the home communication network 210 of the UE 202 via a data base interface 206, 207.

In a fifth step, the roaming communication link with the UE 202 is initiated based on the subscriber-specific data of the UE 202 received via the RDL entity 253.

The RDL entity 253 may for example request the subscriber-specific data of the UE 202 from a unified data repository (UDR) 230 of the home communication network 210 of the UE 202. The data base interface can provide a secure interface between the RDL entity 253 and the UDR 230 of the home communication network 210 over which data of the RDL entity can be synchronized with corresponding data of the UDR 230. For example, a network entity of the home communication network 210 such as an AMF entity 221 or an SMF entity 222 can synchronize the subscriber-specific data stored in the RDL entity 253.

The RDL entity 253 can request the subscriber-specific data of the UE 202 via a routing shared data layer (RSDL) interface with the home communication network 210. The RDL entity 253 can store or provide a local replica of the subscriber-specific data of the UE. This local replica can be obtained from a unified data repository (UDR) 230 of the home communication network 210, for example. The local replica of the user specific data of the RDL entity 253 may be updated with the subscriber-specific data from the UDR 230 of the home communication network 210.

The network entity 251 of the visited communication network can retrieve the subscriber-specific data of the UE 202 based on data base functions applied to the RDL entity 253. For example, the AMF entity 251 of the visited communication network, can retrieve the subscriber-specific data of the UE 202 based on a database function call directed to the RDL entity 253. The subscriber-specific data of the UE 202 stored or provided by the RDL entity 253 can be encrypted and/or encoded. A secure key for decrypting and/or decoding the subscriber-specific data of the RDL entity 253 can be stored in the home communication network, in particular in a UDR 230 of the home communication network 210, e.g. an AUSF entity of the home communication network. The network entity 251 of the visited communication network, for example, can retrieve the secure key from the home communication network before retrieving the subscriber-specific data from the RDL entity 253.

The RDL entity 253 can request the subscriber-specific data of the UE 202 via an interface 206 with the AMF entity 221 of the home communication network 210 or via an interface 207 with the SMF entity 222 of the home communication network 210. These interfaces can be implemented as routing shared data layer (RSDL) interfaces as shown in FIG. 2.

By installing the routing data layer (RDL) entity 253 in the visited communication network 240, the UE's 202 connection procedure in the visited PLMN can be accelerated since the UE 202 can obtain all relevant data to establish the roaming communication over the visited network 240 (or network slice) from the RDL entity 253 which provides all required data for the roaming UE 202. Hence, the UE 202 no longer needs to query a variety of network elements using a variety of different interfaces, which may not even exist in the visited network 240, and possibly make the construction of the roaming connection fail. This increases the performance and flexibility of the communication, especially when roaming in 5G communication networks 200 as shown in FIG. 2. In particular for 5G communication networks, the system architecture (shown in FIG. 1) for the roaming scenario can be simplified since the new RDL entity 253 can hold all required data, thereby replacing all other communications required for obtaining the roaming data.

The registration request 203 may further include an identification of a specific service which the communication terminal 202. requests from the visited communication network 240. The specific service may be provided by the visited communication network 240 based on the identification of the specific service if the visited communication network 240 supports the specific service. Otherwise, if the visited communication network 240 does not support the specific service, the network entity (251 or 252) may transmit a PLMN ID of another communication network to the UE supporting the specific service.

The registration request 203 may further include a key for authenticating the communication terminal 202. The network entity (251 and/or 252) may authenticate the communication terminal 202 via an authentication entity 231 of the home communication network 210 based on the key.

In the following, an exemplary procedure of message transmission for establishing the roaming connection is described.

1) UE 202 initiates network registration or session setup dials phone number.
2) UE 202 sends call number to Visited PLAIN 240 and signals UE ID, e.g. IMEI or SIM ID.
3) Registration or Session Setup arrives in (Visiting) RAN 252 and continues to (V) AMF 251.
4) V (AMF) 251 recognizes from UE ID that it is roaming UE call.
5) V (AMF) 251 determines Home PLMN BD based on UE ID; alternatively Home PLMN ID is signaled by UE 202.
6) V (AMF) 251 accesses data for call establishment of the UDR (HomeNet) via RDL 253; RDL uses Routing Shared Data Layer (RSDL) 206, 207 as a pure database function,
7) Registration or session setup with data obtained via RDL 253.

Figure 3:
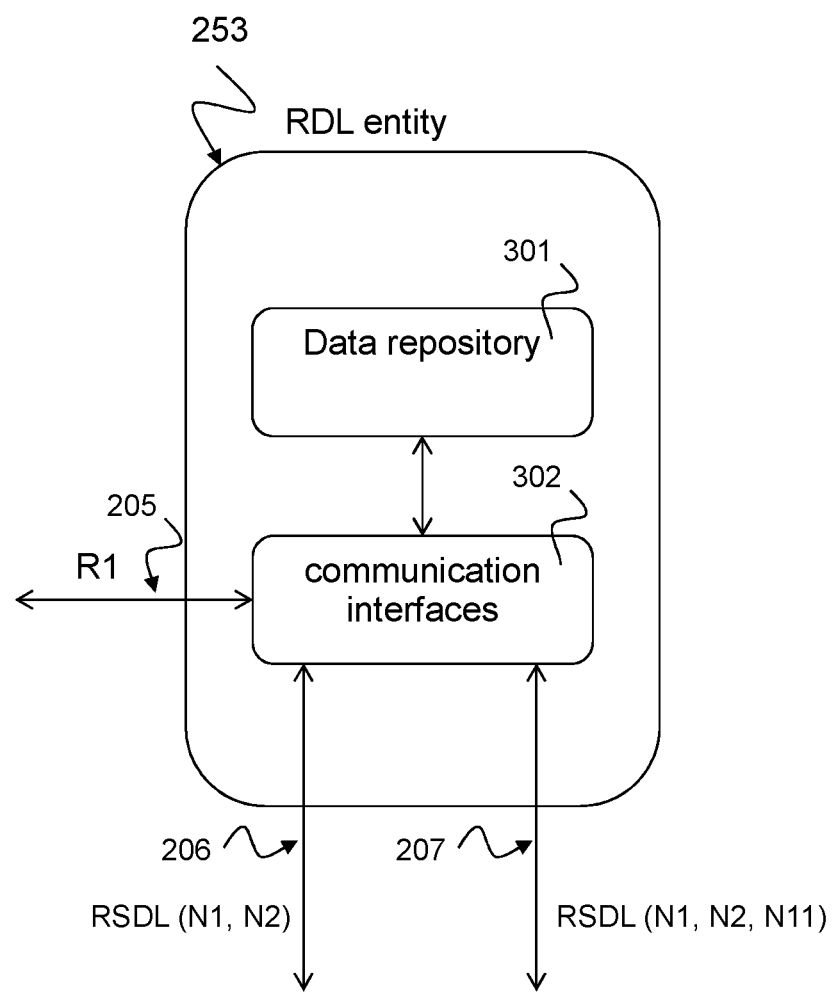
FIG. 3 shows a block diagram of an exemplary routing data layer (RDL) entity 253 of a visited communication network according to the disclosure.

FIG. 3 shows a block diagram of an exemplary routing data layer (RDL) entity 253 of a visited communication network according to the disclosure. The RDL entity 253 may be located in a visited communication network 240 or in a network slice of the visited communication network 240. The RDL entity 253 may be implemented in hardware or software, for example as a silicon chip designed to implement the above-described functionality of the RDL entity or as a database function in a software implementation, e.g. as described above.

The RDL entity 253 can be used to initiate a roaming communication link with the user equipment (UE) 202 in the visited communication network 240 or in the network slice of the visited communication network 240. The RDL entity 253 includes one or more communication interfaces 302, e.g. a communication interface R1 205 with the AMF entity 251 and a database interface (206 or 207) with a network entity (222 and/or 221) of the home communication network 210 of the UE 202. The RDL entity 253 further includes a data repository 301 that is configured to implement the techniques described above with respect to FIG. 2.

I.e., the data repository 253 is configured to store subscriber-specific data of the roaming UE 202, the data repository 253 is configured to provide the subscriber-specific data to the network entity 251 of the visited communication network 240, and the data repository 253 is configured to keep the subscriber-specific data synchronized with corresponding subscriber-specific data stored in the home communication network 210.

The communication interface (R1) with the network entity 251 of the visited communication network 240 may be configured to control the RDL entity 253 by the network entity 251 of the visited communication network 240, e.g. by an AMF entity 251 of the visited communication network 240 to request the subscriber-specific data from the home communication network 210.

The RDL entity 253 may be used in a communication system, e.g. as described above with respect to FIG. 2. Such a communication system may be implemented as a 5G communication system. The communication system comprises: the visited communication network 240 of the UE 202, in particular a network slice of the visited communication network 240; a home communication network 210 of the UE 202; and the RDL entity 253 of the visited communication network 240 which is configured to provide subscriber-specific data of the UE. The subscriber-specific data of the UE 202 is synchronized with corresponding subscriber-specific data of the UE 202 stored in the home communication network 210.

In an exemplary implementation the following exemplary functionality can be implemented by the visited network or the visited network slice:

1) RDL 253 provides local repository of home network 210 UDR data 230;
2) Secure interface between RDL 253 and Home UDR 230, over which data is always synchronized. Home UDR 230 can replicate data to RDL 253.
3) RDL 253 can encrypt data that is stored there.
4) Home PLMN 210 has access to RDL 253 to synchronize data.
5) No keys or private keys on RDL 253, these remain in Home UDR 230.
6) RDL 253 provides database function call for (V) AMF 251.

This functionality provides the following advantages: The routing shared data layer (RSDL) provides a dedicated roaming interface between the RDL entity 253 of the visited communication network 240 or slice and the home communication network 210 or slice, e.g. the UDR database 230. This roaming interface can be a direct interface between the respective network entities. This roaming interface can be preconfigured or established upon request. In any case, the roaming process is simplified by using that new dedicated roaming interface. Further, the same subscriber-specific data of the home communication network 210 or network slice are replicated to the visited communication network 240 or network slice, the RDL entity 253 hence provides a copy of the required data for the roaming process in the local environment of the visited communication network 240 or network slice. This kind of data repository accelerates the roaming process and reduces data and message traffic on the various communication interfaces in and in between each of the visited communication network 240 and the home communication network 210.

Figure 4:
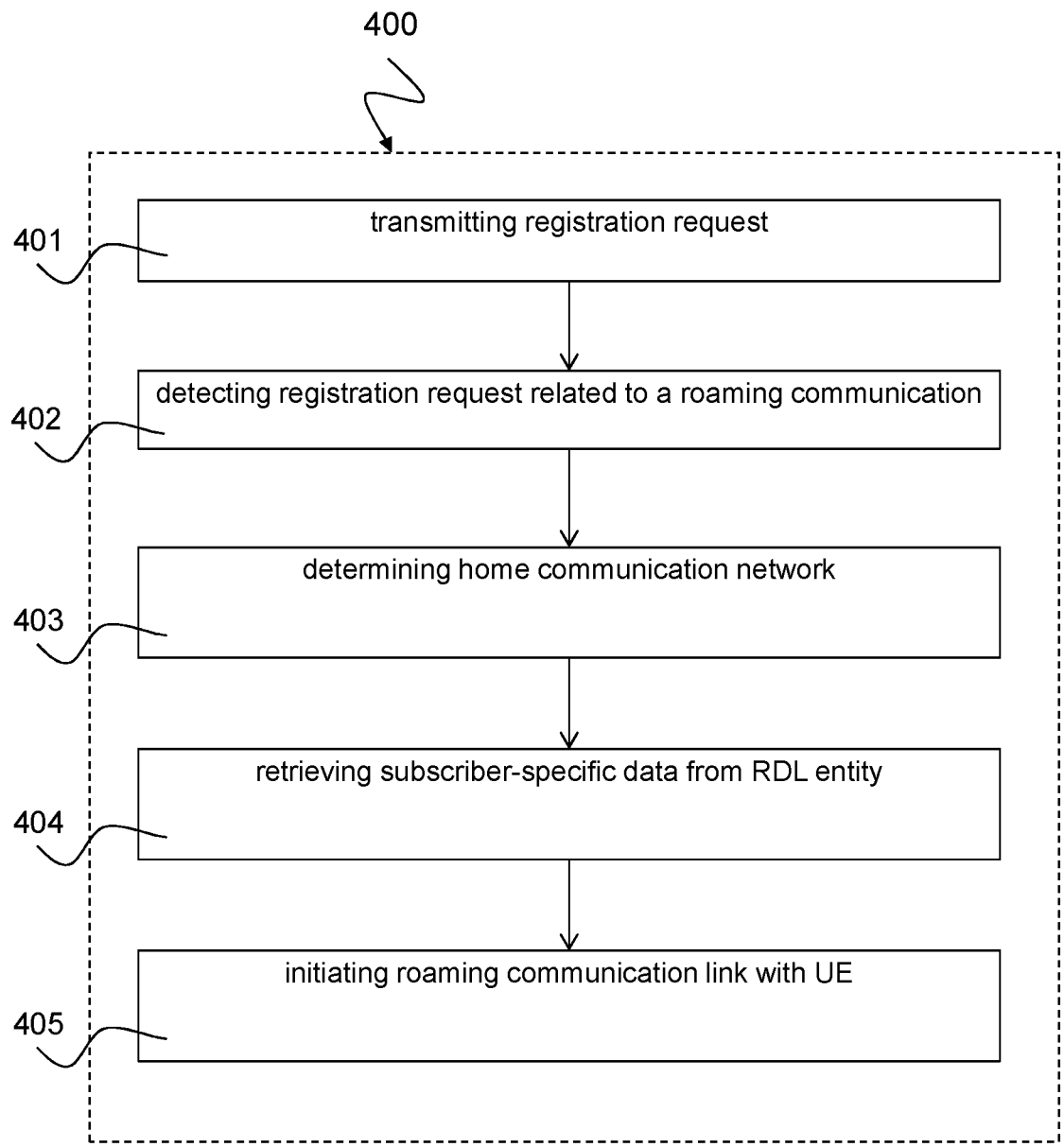
FIG. 4 shows a schematic diagram illustrating an exemplary method 400 for initiating a roaming communication link with a UE in a visited communication network according to the disclosure.

FIG. 4 shows a schematic diagram illustrating an exemplary method 400 for initiating a roaming communication link with a UE in a visited communication network according to the disclosure.

In a first step 401, the method 400 includes: transmitting a registration request 203 by the UE 202 to a network entity 251 of the visited communication network 240, wherein the registration request comprises an identity (UE ID) of the user equipment, e.g. as described above with respect to FIGS. 2 and 3.

In a second step 402, the method 400 includes: detecting by the network entity 251 of the visited communication network 240, based on the UE ID, that the registration request 203 is related to a roaming communication with the UE, e.g. as described above with respect to FIGS. 2 and 3.

In a third step 403, the method 400 includes: determining by the network entity 251 of the visited communication network 240 a home communication network 210 of the UE 202, e.g. as described above with respect to FIGS. 2 and 3.

In a fourth step 404, the method 400 includes: retrieving, by the network entity 251 of the visited communication network, subscriber-specific data of the UE 202 from a routing data layer (RDL) entity 253 of the visited communication network 240 for roaming the UE in the visited communication network 240, wherein the RDL entity is coupled to the home communication network 210 of the UE 202 via a data base interface 206, 207, e.g. as described above with respect to FIGS. 2 and 3.

In a fifth step 405, the method 400 includes: initiating the roaming communication link with the UE 202 based on the subscriber-specific data of the UE 202 received via the RDL entity 253, e.g. as described above with respect to FIGS. 2 and 3.

The method 500 may include further steps, such as, for example, according to the method steps described above with reference to FIGS. 2 and 3.

Another aspect of the invention is related to a computer program product comprising program code for performing the method 400 or the functionalities described above, when executed on a computer or a processor. The method 400 may be implemented as program code that may be stored on a non-transitory computer medium. The computer program product may implement the techniques described above with respect to FIGS. 2 to 4.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A method for initiating a roaming communication link with a user equipment (UE) in a visited communication network, the method comprising:

transmitting a registration request by the UE to a network entity of the visited communication network, wherein the registration request comprises an identity (UE ID) of the user equipment;

detecting by the network entity of the visited communication network, based on the UE ID, that the registration request is related to a roaming communication with the UE;

determining by the network entity of the visited communication network a home communication network of the UE;

retrieving, by the network entity of the visited communication network, via a communication interface between the network entity and a routing data layer (RDL) entity, subscriber-specific data of the UE from a data repository of the routing data layer (RDL) entity of the visited communication network for initiating the roaming communication link of the UE in the visited communication network based on the subscriber-specific data of the UE, wherein the RDL entity is coupled to the home communication network of the UE via a data base interface; and initiating by the visited communication network the roaming communication link with the UE based on the subscriber-specific data of the UE received via the RDL entity;

the method further comprising requesting, by the RDL entity, the subscriber-specific data of the UE from a unified data repository (UDR) of the home communication network of the UE;

wherein the data base interface provides a secure interface between the RDL entity and the UDR of the home communication network over which data of the RDL entity is synchronized with corresponding data of the UDR.

2. The method of claim 1, comprising synchronizing the subscriber-specific data stored in the RDL entity by a network entity of the home communication network including an Access and Mobility Management Function (AMF) entity or a Session Management Function (SMF) entity.

3. The method of claim 1, comprising storing or providing, by the RDL entity, the local replica of the subscriber-specific data of the UE, wherein the local replica is obtained from a unified data repository of the home communication network.

4. The method of claim 3, comprising updating the local replica of the user specific data of the RDL entity with the subscriber-specific data from the UDR of the home communication network.

5. The method of claim 1, comprising retrieving, by the network entity of the visited communication network, the subscriber-specific data of the UE based on data base functions applied to the RDL entity.

6. The method of claim 1, comprising retrieving, by an Access and Mobility Management Function (AMF) entity of the visited communication network, the subscriber-specific data of the UE based on a database function call directed to the RDL entity.

7. The method of claim 1, comprising encrypting and/or encoding the subscriber-specific data of the UE stored or provided by the RDL entity.

8. The method of claim 7, comprising storing a secure key for decrypting and/or decoding the subscriber-specific data stored or provided by the RDL entity in the home communication network, including a unified data repository (UDR) of the home communication network.

9. The method of claim 8, comprising retrieving, by the network entity of the visited communication network, the secure key from the home communication network before retrieving the subscriber-specific data from the RDL entity.

10. The method of claim 1, comprising requesting, by the RDL entity, the subscriber-specific data of the UE via an interface with an AMF entity of the home communication network or via an interface with an SMF entity of the home communication network.

11. A method for initiating a roaming communication link with a user equipment (UE) in a visited communication network, the method comprising:

transmitting a registration request by the UE to a network entity of the visited communication network, wherein the registration request comprises an identity (UE ID) of the user equipment;

detecting by the network entity of the visited communication network, based on the UE ID, that the registration request is related to a roaming communication with the UE;

determining by the network entity of the visited communication network a home communication network of the UE;

retrieving, by the network entity of the visited communication network, via a communication interface between the network entity and a routing data layer (RDL) entity, subscriber-specific data of the UE from a routing data layer (RDL) entity of the visited communication network for roaming the UE in the visited communication network, wherein the RDL entity is coupled to the home communication network of the UE via a data base interface, the RDL being configured to store or provide a local replica of the subscriber-specific data of the UE; and initiating the roaming communication link with the UE in a network slice of the visited communication network based on the subscriber-specific data of the UE received via the RDL entity, the method further comprising requesting, by the RDL entity, the subscriber-specific data of the UE from a unified data repository (UDR) of the home communication network of the UE;

wherein the data base interface provides a secure interface between the RDL entity and the UDR of the home communication network over which data of the RDL entity is synchronized with corresponding data of the UDR, wherein the network slice is based on multiple virtual networks having been created with each of said virtual networks including an independent set of logical network functions.

12. The method of claim 11, wherein each of said independent sets of said logical network functions support needs of user equipment within the visited communication network.

13. The method of claim 1, wherein said initiating the roaming communication link with the UE in the network slice of the visited communication network is performed by network slicing in a virtual network architecture using software-defined networking (SDN) and network functions virtualization (NFV) in a fixed network.

14. The method of claim 1, wherein the network slice is one of a plurality of virtual networks of the visited communication network that are created on a common physical infrastructure.

15. The method of claim 1, wherein said network slice of the visited communication network is completely isolated from other network slices of the visited communication network such that no other network slice of the visited communication network can disturb traffic in said network slice.

16. A method for initiating a roaming communication link with a user equipment (UE) in a visited communication network, the method comprising:

transmitting a registration request by the UE to a network entity of the visited communication network, wherein the registration request comprises an identity (UE ID) of the user equipment;

detecting by the network entity of the visited communication network, based on the UE ID, that the registration request is related to a roaming communication with the UE;

determining by the network entity of the visited communication network a home communication network of the UE;

retrieving, by the network entity of the visited communication network, via a communication interface between the network entity and a routing data layer (RDL) entity, subscriber-specific data of the UE from a data repository of the routing data layer (RDL) entity of the visited communication network for initiating the roaming communication link of the UE in the visited communication network based on the subscriber-specific data of the UE, wherein the RDL entity is coupled to the home communication network of the UE via a data base interface; and initiating by the visited communication network the roaming communication link with the UE based on the subscriber-specific data of the UE received via the RDL entity, wherein retrieving the subscriber-specific data of the UE is based on data base functions which only require a memory address for retrieving the user-specific data, wherein the memory address comprises a Public Land Mobile Network (PLMN) ID of another PLMN than the home communication network.

17. The method of claim 16, wherein the database interface is configured to retrieve the subscriber-specific data of the roaming UE from the home communication network.

18. The method of claim 17, further comprising synchronizing, by the home communication network or the visited communication network, the subscriber-specific data of the RDL entity with corresponding subscriber-specific data stored in the home communication network.

* * * * *